United States Patent
Tsuji

(10) Patent No.: US 8,490,477 B2
(45) Date of Patent: Jul. 23, 2013

(54) TESTING DEVICE FOR TORQUE CONVERTER

(75) Inventor: Masanobu Tsuji, Nagoya (JP)

(73) Assignee: Meidensha Corporation, Tokyo (JP)

( * ) Notice: Subject to any disclaimer, the term of this patent is extended or adjusted under 35 U.S.C. 154(b) by 352 days.

(21) Appl. No.: 12/934,020

(22) PCT Filed: Mar. 10, 2009

(86) PCT No.: PCT/JP2009/054584
§ 371 (c)(1),
(2), (4) Date: Sep. 22, 2010

(87) PCT Pub. No.: WO2009/119309
PCT Pub. Date: Oct. 1, 2009

(65) Prior Publication Data
US 2011/0016992 A1    Jan. 27, 2011

(30) Foreign Application Priority Data
Mar. 25, 2008  (JP) ................................. 2008-077187

(51) Int. Cl.
*G01M 15/00*    (2006.01)
(52) U.S. Cl.
USPC .................. 73/116.04; 73/116.01; 73/116.05
(58) Field of Classification Search
USPC ......................................... 73/116.01–116.05
See application file for complete search history.

(56) References Cited

U.S. PATENT DOCUMENTS

| | | | | |
|---|---|---|---|---|
| 3,903,737 A | * | 9/1975 | Burden et al. | 73/114.59 |
| 4,199,979 A | * | 4/1980 | Herr et al. | 73/862.09 |
| 4,823,596 A | * | 4/1989 | Meyers et al. | 73/115.03 |
| 5,646,355 A | * | 7/1997 | Fukushima et al. | 73/862.195 |
| 6,044,697 A | * | 4/2000 | Imano | 73/115.04 |
| 6,651,493 B2 | | 11/2003 | Myers et al. | |

FOREIGN PATENT DOCUMENTS

| | | |
|---|---|---|
| JP | 63-201548 A | 8/1988 |
| JP | 5-11484 Y2 | 3/1993 |
| JP | 2599603 Y2 | 7/1999 |
| JP | 2006-275889 A | 10/2006 |

* cited by examiner

*Primary Examiner* — Lisa Caputo
*Assistant Examiner* — Jonathan Dunlap
(74) *Attorney, Agent, or Firm* — Foley & Lardner LLP

(57) ABSTRACT

A testing device for a torque converter having a turbine portion 2 and a stator portion 3, including a turbine shaft 4 rotatably supported by a first support portion 6, and a stator shaft 9 concentrically disposed on an outer circumferential side of the turbine shaft 4 and axially moveably and non-rotatably supported by a second support portion 8. The turbine shaft 4 has a central oil passage 4b and a splined portion 4a on the outer circumferential periphery which is engaged with a splined portion 2a of the turbine portion 2 when the turbine shaft 4 is axially downwardly moved. The stator shaft 9 has a splined portion 9d on the outer circumferential periphery which is engaged with a splined portion 3a of the stator portion 3 when the stator shaft 9 is axially downwardly moved. A spring 11 is provided, which biases the stator shaft 9 toward the torque converter.

5 Claims, 4 Drawing Sheets

TESTING DEVICE FOR TORQUE CONVERTER

TECHNICAL FIELD

The present invention relates to a testing device for a production line of a torque converter.

BACKGROUND OF THE INVENTION

FIG. 3 is a vertical cross section showing a pre-coupling state in which a torque converter (i.e., a work) is not coupled with a conventional testing device for the torque converter. FIG. 4 is a vertical cross section showing a post-coupling state in which the torque converter is coupled with the conventional testing device.

In FIG. 3 and FIG. 4, reference numeral 1 denotes a torque converter, and reference numeral 2 denotes a turbine portion which is disposed within the torque converter 1 and formed with a splined portion 2a on an inner circumferential periphery thereof. Reference numeral 3 denotes a stator portion of the torque converter 1 which is disposed in an upper part of the turbine portion 2 within the torque converter 1 and formed with a splined portion 3a on an inner circumferential periphery thereof.

The turbine portion 2 is rotatably supported by a bearing within the torque converter 1. The stator portion 3 is fixed to an inside of the torque converter 1. The torque converter 1 is placed onto a faceplate in such a state that a fitting sleeve portion 1a is located on an upper side.

On the other hand, a turbine shaft 4 and a stator shaft 5 are concentrically arranged in the testing device such that the turbine shaft 4 is disposed inside of the stator shaft 5. The turbine shaft 4 is rotatably supported, while the stator shaft 5 is fixedly disposed.

The turbine shaft 4 has a splined portion 4a on a lower end portion thereof which is to be engaged with a splined portion 2a of the turbine portion 2 of the torque converter 1. The stator shaft 5 has a splined portion 5a on a lower end portion thereof which is to be engaged with a splined portion 3a of the stator portion 3 of the torque converter 1. The turbine shaft 4 has an oil passage 4b formed at a central part of the turbine shaft 4. In FIG. 4, reference numeral 6 denotes a first support portion which rotatably and integrally supports the turbine shaft 4, and reference numeral 7 denotes a second support portion which fixedly supports the stator shaft 5.

In the above construction, upon carrying out a performance test of the torque converter 1, the turbine shaft 4 and the stator shaft 5 on the side of the testing device are driven to downwardly move from the pre-coupling position of the testing device relative to the torque converter 1 as shown in FIG. 3 by operating a cylinder, and inserted through the fitting sleeve portion 1a into the torque converter 1. Then, as shown in FIG. 4, the splined portions 4a and 5a of the turbine shaft 4 and the stator shaft 5 are brought into engagement with the splined portions 2a and 3a of the turbine portion 2 and the stator portion 3 on the side of the torque converter 1, respectively.

Subsequently, a torque converter oil (or automatic transmission fluid) is fed into the torque converter 1 through the oil passage 4b in the turbine shaft 4 of the testing device at an oil pressure of 2-4 kg/cm². The torque converter oil enters from a lower end of the oil passage 4b into the torque converter 1 and passes through a clearance between an inner circumferential surface of the fitting sleeve portion 1a of the torque converter 1 and an outer circumferential surface of the stator shaft 5 and a through hole 5b which is formed in the stator shaft 5. The torque converter oil then passes through a clearance between the support portions 6 and 7 and is discharged to an outside through a drain hole 7a which is formed in the second support portion 7. Incidentally, in certain circumstances, while measuring a feed pressure of the torque converter oil which is fed through the oil passage 4b and a discharge pressure of the torque converter oil which is discharged from the drain hole 7a, the torque converter oil may be fed from the drain hole 7a into the torque converter 1.

Upon connecting (or engaging) the respective splined portions 4a and 5a of the turbine shaft 4 and the stator shaft 5 with the respective splined portions 2a and 3a of the turbine portion 2 and the stator portion 3 of the torque converter 1, there might occur an abutment (or an interference) between end faces of crests of teeth at the respective splined portions 4a and 5a of the turbine shaft 4 and the stator shaft 5 and end faces of crests of teeth at the respective splined portions 2a and 3a of the turbine portion 2 and the stator portion 3. In such a case, it is not possible to establish the connection (or engagement) between the respective splined portions 2a and 3a of the turbine portion 2 and the stator portion 3 and the respective splined portions 4a and 5a of the turbine shaft 4 and the stator shaft 5. The proportion of a probability of completing the connection by a first connecting operation to a probability of failing to establish the connection or engagement by the first connecting operation are substantially fifty-fifty.

In a case where the connection between the splined portions 2a and 3a and the splined portions 4a and 5a is not established by the first connecting operation, the testing device is temporarily moved upward and then moved downward to attempt a second connecting operation in order to establish the connection therebetween. In this case, the torque converter 1 is rotated to change phases of teeth of the respective splined portions 2a and 3a, thereby increasing a possibility to engage the crests of teeth of the splined portions of one of the testing device and the torque converter 1 with valleys of teeth of the splined portions of the other thereof. The prior art documents relating to the above conventional art are as follows.

Patent Literature 1: Japanese Patent Unexamined Publication No. 63-201548

Patent Literature 2: Japanese Utility Model No. 2599603

SUMMARY OF THE INVENTION

Problems to be Solved by the Invention

As explained above, in order to engage the crests of teeth of the splined portions of one of the testing device and the torque converter 1 with the valleys of teeth of the splined portions of the other thereof by rotating the torque converter 1, it is necessary to change the phases of the teeth such that the crests of teeth of the splined portions of the one of the testing device and the torque converter 1 can be engaged with the valleys of teeth of the splined portions of the other thereof. However, since the splined portion 2a of the turbine portion 2 and the splined portion 3a of the stator portion 3 are disposed within the torque converter 1, it is difficult to carry out the connecting operation while visually checking positions of the crests of teeth of the splined portions of the one of the testing device and the torque converter 1 and the valleys of teeth of the splined portions of the other thereof. Therefore, the connecting operation must be carried out by guesswork. For this reason, even in a case where the connecting operation is carried out by changing the phases of the teeth of the splined portions, it will be difficult to establish the engagement between the crests of teeth of the splined portions of the one of the testing device and the torque converter 1 and the valleys of teeth of the splined portions of the other thereof by carrying out the connecting operation once, and the connecting operation must be repeatedly carried out twice or more with a high frequency.

Therefore, in order to increase a rate of the connection between the teeth of the splined portions of the testing device and the torque converter 1, it will be considered that tip ends of teeth of the respective splined portions 3a and 5a are thinned. However, in this case, although the rate of the connection is temporarily increased, there tends to occur abrasion at tips of teeth of the respective splined portions 3a and 5a due to a force which is caused when interference between the teeth of the respective splined portions 3a and 5a occurs. This will result in adversely affecting the rate of the connection.

Further, in a case where the stator portion 3 of the torque converter 1 undergoes interference with the stator shaft 5 of the testing device, rotation of the torque converter 1 is stopped by the pressing force which is applied from the testing device side to the torque converter 1. Thus, even though the whole torque converter 1 is rotated, it is not effective to suitably rotate the turbine portion 2 and the stator portion 3. Particularly, this tendency is remarkable at the stator portion 3.

The present invention has been made in order to solve the problems as described above. An object of the present invention is to provide a testing device for a torque converter which is capable of increasing a rate of connection between a stator shaft on the side of the testing device and a stator portion on the side of the torque converter upon testing the torque converter, and increasing a rate of connection between the testing device and the torque converter.

Solution to Problem

According to claim 1 of the present invention, there is provided a testing device for a torque converter, the torque converter including a rotatable turbine portion which has a splined portion on an inner circumferential periphery thereof, and a stator portion which is fixedly supported in a concentrical relation to the turbine portion and has a splined portion on an inner circumferential periphery thereof, the testing device comprising:

a turbine shaft rotatably supported on a first support portion, the turbine shaft having a splined portion on an outer circumferential periphery thereof which is engaged with the splined portion of the turbine portion of the torque converter when the turbine shaft is moved downwardly in an axial direction thereof, the turbine shaft having an oil passage for a torque converter oil which extends through a central portion of the turbine shaft, a stator shaft which is disposed concentrically with the turbine shaft on an outer circumferential side of the turbine shaft and is axially moveably and non-rotatably supported on a second support portion, the stator shaft having a splined portion on an outer circumferential periphery thereof which is engaged with the splined portion of the stator portion of the torque converter when the stator shaft is moved downwardly in an axial direction thereof, and a spring which biases the stator shaft toward the torque converter.

According to claim 2 of the present invention, there is provided the testing device for a torque converter which is constructed such that when the torque converter oil is supplied to the testing device, the torque converter oil is filled in a space in which the spring is accommodated.

According to claim 3 of the present invention, there is provided the testing device for a torque converter further comprising a connection checking shaft extending through an elongated hole which is formed in the second support portion, the connection checking shaft being moveable upwardly and downwardly within the elongated hole, the connection checking shaft having one end which is mounted to the stator shaft and the other end which is exposed to an outside of the second support portion, wherein the connection checking shaft is located in a predetermined position so as to determine that the connection between the stator shaft and the stator portion is established.

Effects of the Invention

As described above, according to the present invention of claim 1, the stator shaft of the testing device is axially moveably and non-rotatably supported by the second support portion of the testing device, and the stator shaft of the testing device is biased toward the torque converter which is disposed below the testing device, by the spring for producing a connecting pressure. In a case where there occurs interference between the teeth of the stator portion and the teeth of the stator shaft upon connecting or coupling the torque converter with the testing device, a slippage between the stator portion and the stator shaft is caused by moving the stator shaft of the testing device upwardly and downwardly in the axial direction so that the connection between the stator portion and the stator shaft is established. As a result, not only the connection between the turbine portion and the turbine shaft but also the connection between the stator portion and the stator shaft can be facilitated, thereby achieving the rate of the connection between the testing device and the torque converter of substantially 100% only by one connecting operation. Thus, an efficiency of testing the torque converter can be increased to thereby enhance the productivity of the torque converter. Further, since the pressing force that is generated upon connecting the stator portion and the stator shaft is reduced to a small degree by the spring for producing the connecting pressure, abrasion at tips of the teeth of the respective splined portions can be reduced, which also results in increase in the rate of the connection between the testing device and the torque converter.

According to the present invention of claim 2, when supplying the torque converter oil, the torque converter oil is filled in the space in which the spring for producing the connecting pressure is accommodated, and the oil pressure acts to assist the biasing force of the spring. Therefore, it is possible to prevent the stator portion and the stator shaft from being disconnected from each other.

According to the present invention of claim 3, the testing device further includes the connection checking shaft extending through an elongated hole which is formed in the second support portion. The connection checking shaft is moveable upwardly and downwardly within the elongated hole. The connection checking shaft has one end which is mounted to the stator shaft of the testing device and the other end which is exposed to an outside of the second support portion. When the testing device is downwardly moved to the connection position relative to the torque converter, the connection checking shaft is moved to the predetermined position in which it can be readily determined that the connection between the stator shaft and the stator portion is normally established, even in a small space from an outside of the testing device.

BEST MODE FOR CARRYING OUT THE INVENTION

In the following, a preferred embodiment of the present invention is explained with the accompanying drawings. FIG.

1 and FIG. 2 are a vertical cross section showing a pre-connection state before a testing device of the present invention and a torque converter are connected to each other, and a vertical cross section showing a post-connection state after the testing device of the present invention and the torque converter are connected to each other, respectively.

In FIG. 1 and FIG. 2, a torque converter 1 and a turbine portion 2 and a stator portion 3 of the torque converter 1 are the same as those of the above conventional art. On the other hand, the testing device includes a turbine shaft 4 which is similar to that of the above conventional art and integrally supported by a first support portion 6 rotatably supported on the side of the testing device. Similar to the above conventional art, the turbine shaft 4 has a splined portion 4a on an outer circumferential periphery thereof, and an oil passage 4b for a torque converter oil which extends through a central part of the turbine shaft 4. The splined portion 4a is brought into engagement with a splined portion 2a of the turbine portion 2 of the torque converter 1 when the splined portion 4a is downwardly moved.

Further, a stator shaft 9 of the testing device is disposed on an outer circumferential side of the turbine shaft 4 of the testing device. The stator shaft 9 is supported by a second support portion 8 so as to be upwardly and downwardly moveable in an axial direction thereof and non-rotatable. The second support portion 8 is disposed concentrically with the turbine shaft 4 and fixedly supported on the testing device.

The second support portion 8 includes a base portion 8a and a spline forming portion 8b which is integrally assembled into the base portion 8a. Spaces 10 and 10a are formed over the base portion 8a and the spline forming portion 8b.

The stator shaft 9 of the testing device includes a lower portion 9a which is formed concentrically with the turbine shaft 4 of the testing device with a small clearance therebetween, and an upper portion 9b which radially outwardly projects from the lower portion 9a and then upwardly extends so as to form a step therebetween. The upper portion 9b is formed concentrically with the turbine shaft 4 of the testing device with a large clearance therebetween. The lower portion 9a is disposed between the turbine shaft 4 of the testing device and the second support portion 8 so as to be upwardly and downwardly moveable in the axial direction of the stator shaft 9. The upper portion 9b is accommodated in the spaces 10 and 10a within the second support portion 8 so as to be upwardly and downwardly moveable in the axial direction of the stator shaft 9.

A splined portion 8c is formed on an outer circumferential periphery of the spline forming portion 8b of the second support portion 8. A splined portion 9c is formed on an inner circumferential periphery of the upper portion 9b of the stator shaft 9 of the testing device. These splined portions 8c and 9c are connected with each other so that the stator shaft 9 of the testing device is axially moveably and non-rotatably supported on the second support portion 8.

A splined portion 9d is formed on an outer circumferential periphery of the lower portion 9a of the stator shaft 9 of the testing device. The splined portion 9d is connected with the splined portion 3a of the stator portion 3 of the torque converter 1 when the stator shaft 9 is downwardly moved in the axial direction thereof.

A spring 11 for producing a connecting pressure is disposed in the space 10 which is defined between a part of the second support portion 8 and an upper end of the upper portion 9b of the stator shaft 9 of the testing device. Reference numeral 12 denotes a connection checking shaft having one end portion which is horizontally screwed into the upper portion 9b of the stator shaft 9 of the testing device. The connection checking shaft 12 horizontally extends through an elongated hole 8d which is formed in the second support portion 8. The connection checking shaft 12 is disposed in the elongated hole 8d to be moveable upwardly and downwardly along the axial direction of the stator shaft 9. The other end portion of the connection checking shaft 12 is exposed to an outside of the second support portion 8. Further, since a torque converter oil is flowed into a part of the space 10 in which the spring 11 is accommodated, a seal 13 is disposed between the base portion 8a of the second support portion 8 and the upper portion 9b of the stator shaft 9 of the testing device and a seal 14 is disposed between the base portion 8a and the spline forming portion 8b of the second support portion 8.

In the above construction, upon carrying out a performance test on the torque converter 1, the testing device is driven by a cylinder to downwardly move from the pre-coupling position as shown in FIG. 1, and the turbine shaft 4 and the stator shaft 9 of the testing device are inserted through the fitting sleeve portion 1a into the torque converter 1. Then, as shown in FIG. 2, the splined portion 4a of the turbine shaft 4 and the splined portion 9d of the stator shaft 9 are engaged with the splined portion 2a of the turbine portion 2 and the splined portion 3a of the stator portion 3, respectively.

Subsequently, a torque converter oil is fed into the oil passage 4b in the turbine shaft 4 of the testing device at an oil pressure of 2-4 kg/cm$^2$. The torque converter oil flows from a lower end of the oil passage 4b to an inside of the torque converter 1 and passes through a clearance between the turbine shaft 4 and the stator shaft 9 of the testing device. The torque converter oil flows into the spaces 10 and 10a and fills them. After that, the torque converter oil is discharged to outside from a drain hole 8e which is formed in the base portion 8a of the second support portion 8.

In the above embodiment, upon connecting the testing device and the torque converter 1, the rate of the engagement between the splined portion 2a of the turbine portion 2 and the splined portion 4a of the turbine shaft 4 reaches about 100% in the first one connecting operation by rotating the torque converter 1. Further, the rate of the connection between the testing device and the torque converter 1 can be enhanced by increasing the rate of the connection between the splined portion 3a of the stator portion 3 and the splined portion 9d of the stator shaft 9.

In order to increase the rate of the connection between the splined portion 3a of the stator portion 3 and the splined portion 9d of the stator shaft 9, the testing device is constructed such that the teeth of the splined portion 3a and the teeth of the splined portion 9d can be readily slipped even in a case where interference between the respective teeth of the splined portions 3a and 9d occurs. That is, the stator shaft 9 is axially moveably disposed and pressed with a small force by means of the spring 11 such that the teeth of the splined portion 3a and the teeth of the splined portion 9d can be slipped and connected with each other even in a case where the interference therebetween occurs.

As a result, the rate of the connection between the stator portion 3 and the stator shaft 9 reaches about 100% by the first one connecting operation, namely, the rate of the connection between the testing device and the torque converter 1 reaches about 100% by the first one connecting operation. Accordingly, an increase in production takt time can be avoided to thereby enhance the productivity. Further, since the pressing force which is exerted onto the stator shaft 9 when the stator portion 3 and the stator shaft 9 are connected with each other and the turbine portion 2 and the turbine shaft 4 are connected with each other is reduced by using the spring 11 having a weak force. This results in reduction in abrasion at the tip end of the splined portions 2a, 3a, 4a and 9d, thereby enhancing the rate of the connection between the testing device and the torque converter 1.

Further, since the torque converter oil pushes the stator shaft 9 upwardly from a lower side thereof after the torque converter oil is supplied into the torque converter 1, there is a possibility that disconnection between the stator portion 3 and the stator shaft 9 occurs. For this reason, the spaces 10 and 10a are filled with the torque converter oil such that the oil pressure of the torque converter oil assists the pressing force of the spring 11 for producing the connecting pressure so as to urge the stator shaft 9 toward the stator portion 3 and inhibit the disconnection between the stator portion 3 and the stator shaft 9.

Further, the connection checking shaft 12 having the one end portion mounted to the stator shaft 9 of the testing device extends through the elongated hole 8d formed in the second support portion 8. The other end portion of the connection checking shaft 12 is exposed to an outside of the second support portion 8. The connection checking shaft 12 is disposed to be moveable upwardly and downwardly within the elongated hole 8d along the axial direction of the stator shaft 9. When the turbine shaft 4 and the stator shaft 9 of the testing device are downwardly moved to the connection position where the turbine shaft 4 and the stator shaft 9 are to be connected with the turbine portion 2 and the stator portion 3 of the torque converter 1, determination as to whether the connection between the turbine portion 2 and the turbine shaft 4 and the connection between the stator portion 3 and the stator shaft 9 are established is made using the connection checking shaft 12 as follows. If the connection between the turbine portion 2 and the turbine shaft 4 and the connection between the stator portion 3 and the stator shaft 9 are established in the connection position, the connection checking shaft 12 is downwardly moved to the position in the elongated hole 8d as indicated by solid line shown in FIG. 2. In this state, it is possible to determine establishment of the connection between the splined portions 2a and 4a and the connection between the splined portions 3a and 9d from the outside of the testing device by detecting the connection between the turbine portion 2 and the turbine shaft 4 and the connection between the stator portion 3 and the stator shaft 9 by means of a visual inspection or a sensor such as a proximity sensor.

Incidentally, in this embodiment, the splined portions 8c and 9c are formed on the second support portion 8 and the stator shaft 9, respectively. However, any other construction can be substituted for the splined portions so long as the stator shaft 9 is axially moveably and non-rotatably supported by the second support portion 8.

REFERENCE SIGNS LIST

Figure 1:
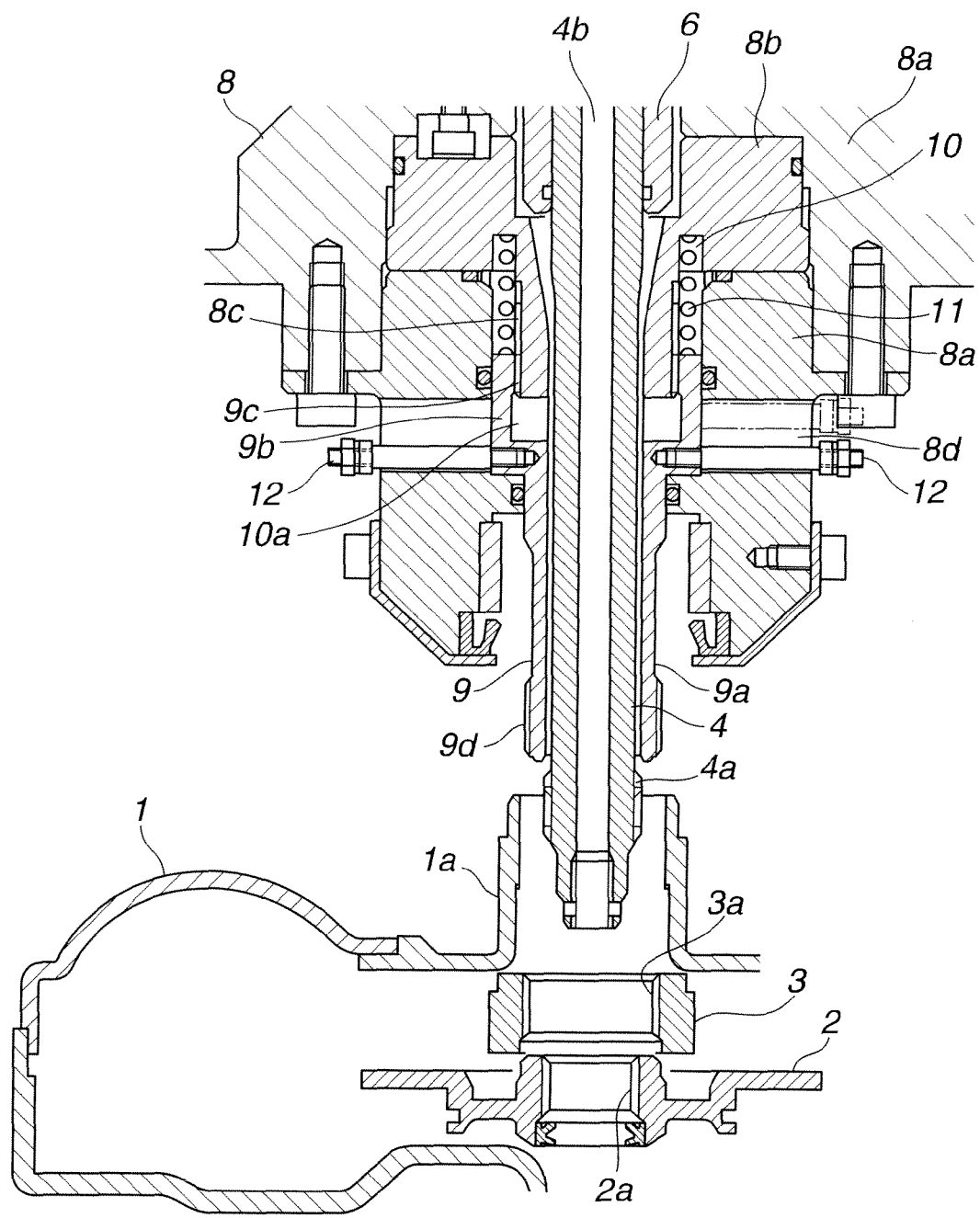
FIG. 1 is a vertical cross section of a testing device for a torque converter, according to an embodiment of the present invention, showing a pre-coupling position of the testing device according to the embodiment of the present invention before being coupled to the torque converter.
Figure 2:
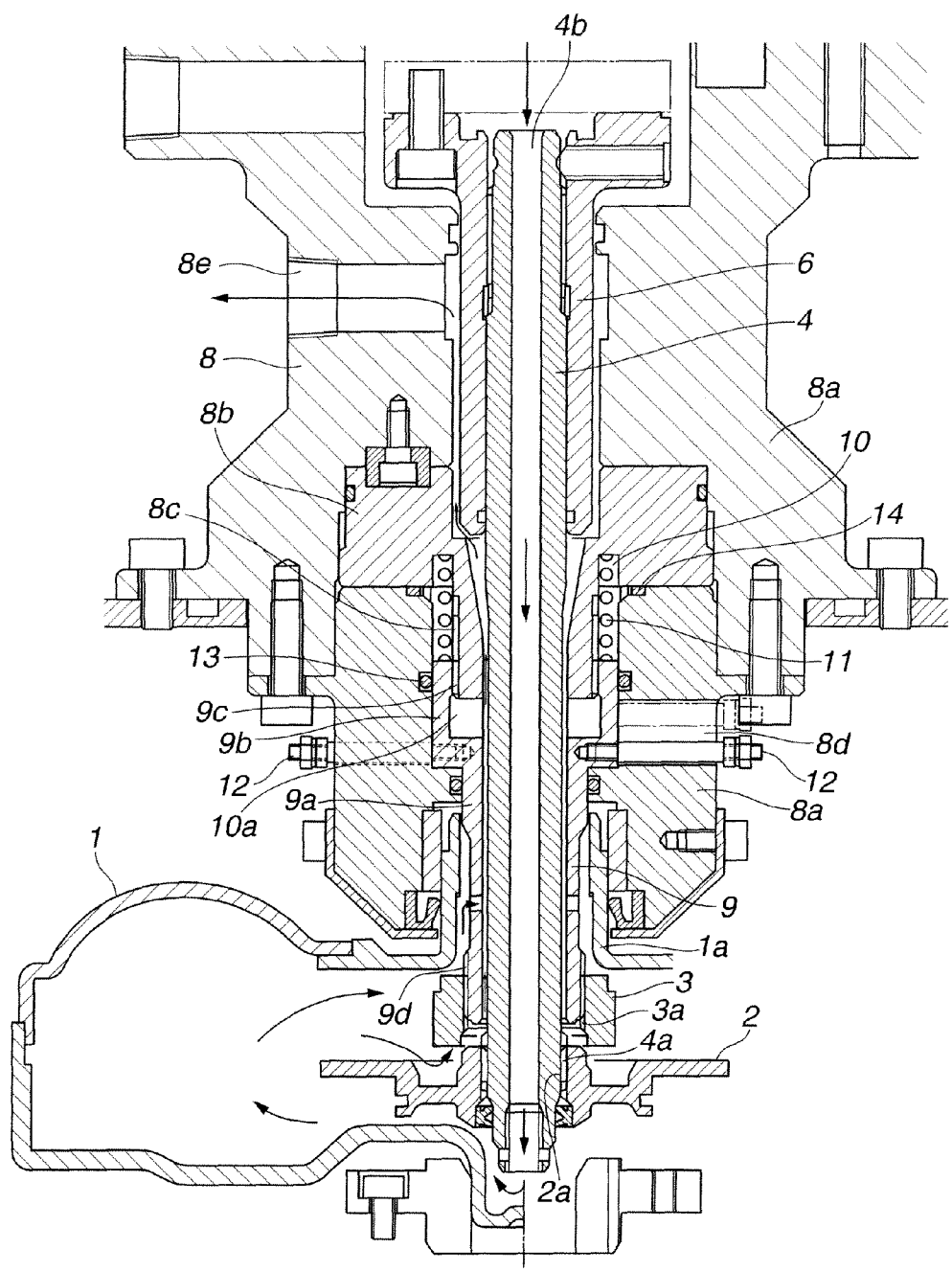
FIG. 2 is a vertical cross section of the testing device for a torque converter, according to the embodiment of the present invention, showing a post-coupling position of the testing device according to the embodiment of the present invention after being coupled to the torque converter.
Figure 3:
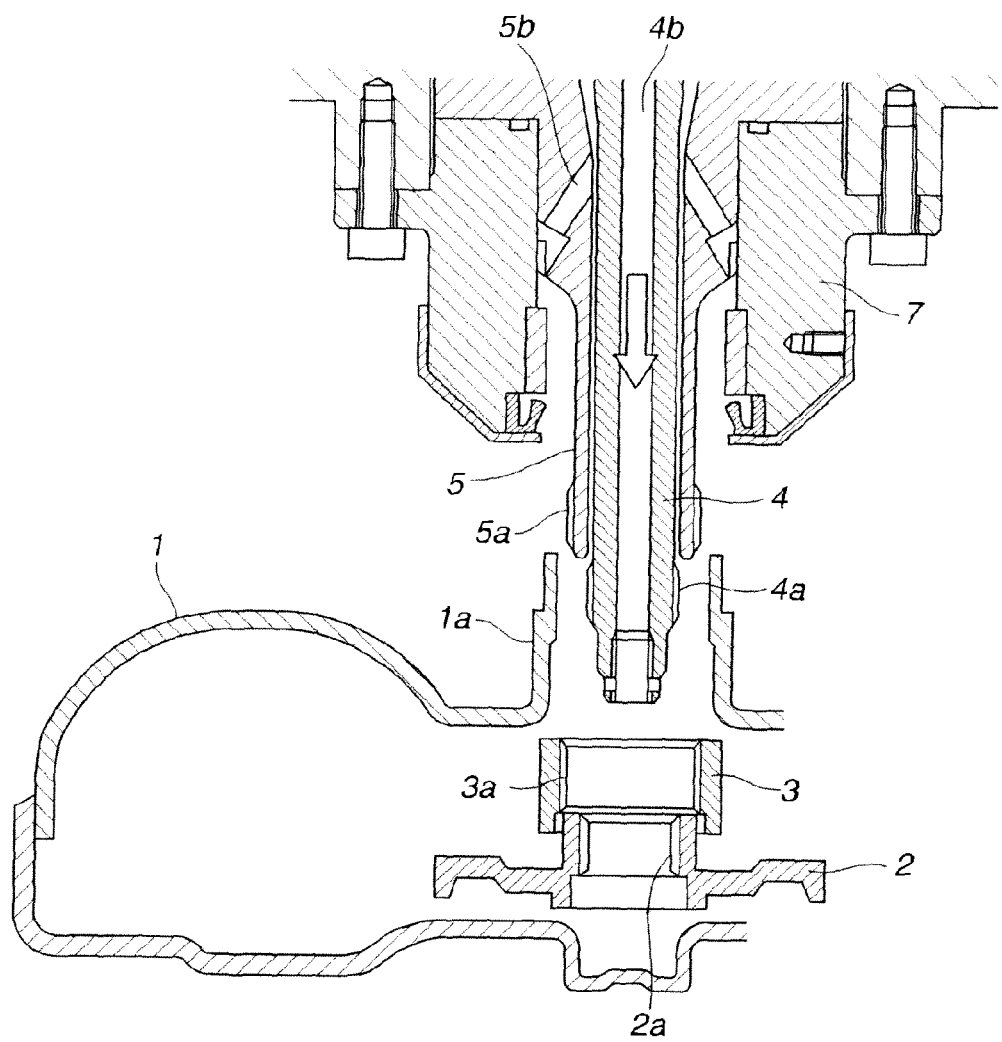
FIG. 3 is a vertical cross section of a conventional testing device for a torque converter, showing a pre-coupling position of the conventional testing device before being coupled to the torque converter.
Figure 4:
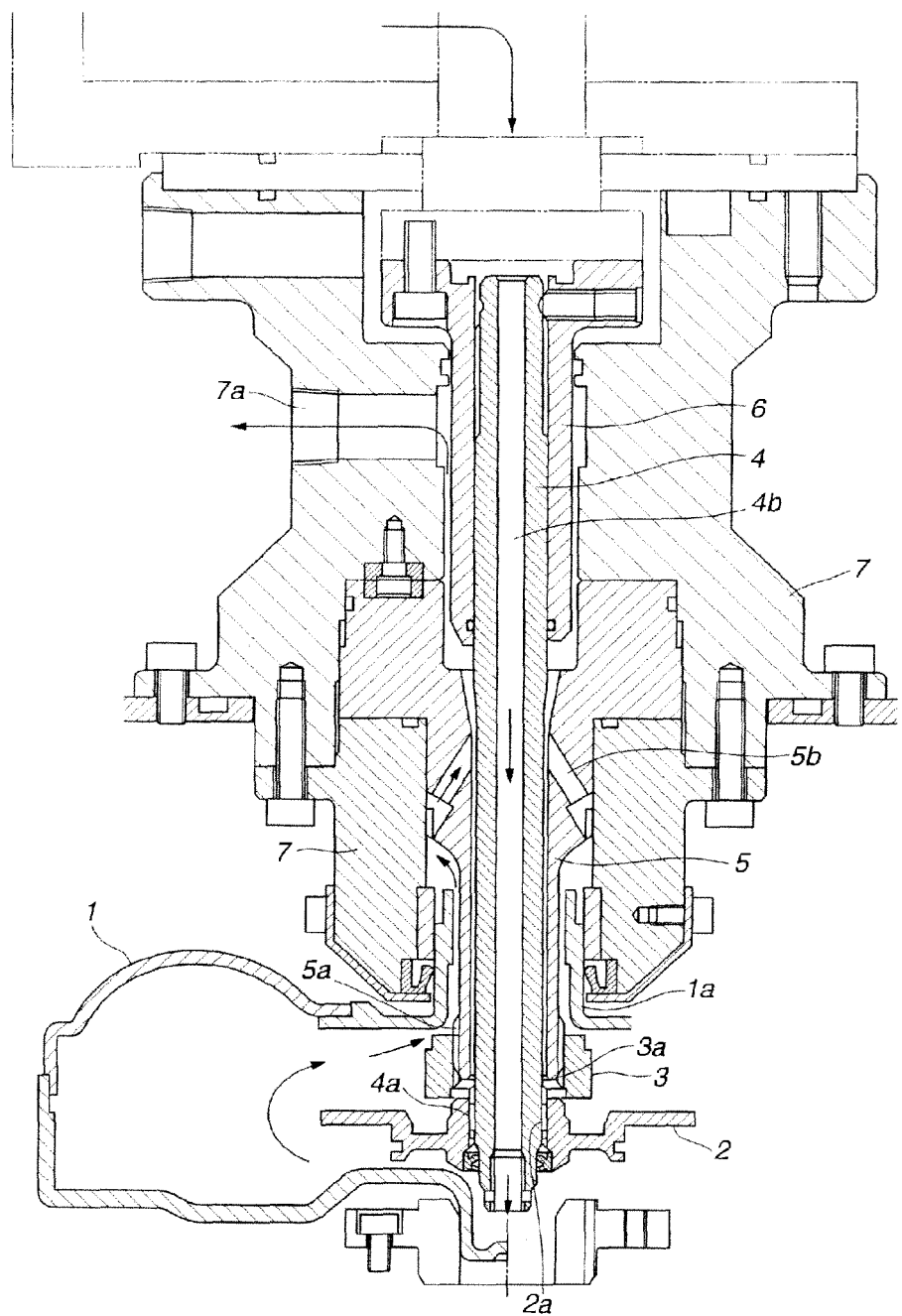
FIG. 4 is a vertical cross section of the conventional testing device for a torque converter, showing a post-coupling position of the conventional testing device after being coupled to the torque converter.

1 ... torque converter
2 ... turbine portion on the torque converter side
2a, 3a, 4a, 8c, 9c, 9d ... splined portion
3 ... stator portion on the torque converter side
4 ... turbine shaft on the testing device side
4b ... oil passage
6 ... first support portion
8 ... second support portion
8a ... base portion
8b ... spline forming portion
8d ... elongated hole
8e ... drain hole
9 ... stator shaft on the testing device side
10, 10a ... space
11 ... spring for producing a connecting pressure
12 ... connection checking shaft

The invention claimed is:
1. A testing device for a torque converter, the torque converter including a rotatable turbine portion which has a splined portion on an inner circumferential periphery thereof, and a stator portion which is fixedly supported in a concentrical relation to the turbine portion and has a splined portion on an inner circumferential periphery thereof, the testing device comprising:
a turbine shaft rotatably supported on a first support portion, the turbine shaft having a splined portion on an outer circumferential periphery thereof which is engaged with the splined portion of the turbine portion of the torque converter when the turbine shaft is moved downwardly in an axial direction thereof, the turbine shaft having an oil passage for a torque converter oil which extends through a central portion of the turbine shaft,
a stator shaft disposed concentrically with the turbine shaft with a clearance between the stator shaft and the turbine shaft, the stator shaft on an outer circumferential side of the turbine shaft being supported on a second support portion to be axially moveable and non-rotatable with respect to the second support portion, the stator shaft having a splined portion on an outer circumferential periphery thereof which is engaged with the splined portion of the stator portion of the torque converter when the stator shaft is moved downwardly in an axial direction thereof, and
a spring which biases the stator shaft toward the torque converter,
wherein the testing device is constructed such that when the torque converter oil is supplied to the testing device, the torque converter oil is filled in a space in which the spring is accommodated through the clearance between the stator shaft and the turbine shaft,
the space in which the spring is accommodated being formed in the second support portion, and
wherein the stator shaft is urged toward the stator portion of the torque converter by a pressing force of the spring and an oil pressure of the torque converter oil which is filled in the space in which the spring is accommodated through the clearance between the stator shaft and the turbine shaft.

2. The testing device for a torque converter as claimed in claim 1, further comprising a connection checking shaft extending through an elongated hole formed in the second support portion, the connection checking shaft being moveable upwardly and downwardly within the elongated hole, the connection checking shaft having one end which is mounted to the stator shaft and the other end which is exposed to an outside of the second support portion, wherein the connection checking shaft is located in a predetermined position to enable determination that the connection between the stator shaft and the stator portion is established.

3. The testing device for a torque converter as claimed in claim 1, wherein the stator shaft comprises a lower portion which is formed concentrically with the turbine shaft, and an upper portion which radially outwardly projects from the lower portion and upwardly extends so as to form a step therebetween, the upper portion being formed concentrically with the turbine shaft.

4. The testing device for a torque converter as claimed in claim 3, wherein the lower portion of the stator shaft is axially moveably disposed between the turbine shaft and the second support portion, and the upper portion of the stator shaft is axially moveably disposed in the space in which the spring is accommodated.

5. The testing device for a torque converter as claimed in claim 4, wherein the space in which the spring is accommodated is defined between an upper end of the upper portion of the stator shaft and a part of the second support portion.

\* \* \* \* \*